(12) United States Patent
Lambright

(10) Patent No.: US 7,246,843 B2
(45) Date of Patent: Jul. 24, 2007

(54) EXTENDABLE AND RETRACTABLE SUPPORT SYSTEM

(76) Inventor: Michael Lambright, 14867 County Rd. 20, Middlebury, IN (US) 46540

( * ) Notice: Subject to any disclaimer, the term of this patent is extended or adjusted under 35 U.S.C. 154(b) by 335 days.

(21) Appl. No.: 10/959,699

(22) Filed: Oct. 6, 2004

(65) Prior Publication Data

US 2006/0070307 A1    Apr. 6, 2006

(51) Int. Cl.
*B60P 3/355* (2006.01)
(52) U.S. Cl. .................. 296/173; 296/26.05; 296/171
(58) Field of Classification Search ............... 296/156, 296/173, 175, 171, 165, 168, 26.01, 26.05, 296/26.04; 52/66; 135/88.1
See application file for complete search history.

(56) References Cited

U.S. PATENT DOCUMENTS

| | | | | |
|---|---|---|---|---|
| 2,853,338 A | * | 9/1958 | Stanley | 296/173 |
| 3,507,535 A | * | 4/1970 | Wallace | 296/173 |
| 3,508,782 A | * | 4/1970 | Corl et al. | 296/173 |
| 3,519,306 A | | 7/1970 | Young | |
| 3,674,305 A | * | 7/1972 | Steury | 296/156 |
| 3,749,439 A | * | 7/1973 | Ferguson | 296/26.05 |
| 3,924,889 A | | 12/1975 | Gogush | |
| 3,981,529 A | | 9/1976 | Bontrager | |
| 4,171,843 A | | 10/1979 | Steury | |
| 4,201,413 A | | 5/1980 | Rowe | |
| 4,299,421 A | * | 11/1981 | Bontrager | 296/26.05 |
| 4,317,590 A | | 3/1982 | Young | |
| 4,328,989 A | * | 5/1982 | Childers | 296/26.05 |
| 4,362,258 A | | 12/1982 | French | |
| 4,856,841 A | * | 8/1989 | Rafi-Zadeh | 296/100.08 |
| 4,981,319 A | | 1/1991 | Gerzeny et al. | |
| 5,704,677 A | | 1/1998 | Steury et al. | |
| 5,769,485 A | | 6/1998 | Bontrager et al. | |
| 5,865,499 A | | 2/1999 | Keyser | |
| 5,951,096 A | * | 9/1999 | Steury et al. | 296/171 |
| 6,206,456 B1 | | 3/2001 | Steury | |
| 6,443,516 B2 | | 9/2002 | Lambright | |
| 6,494,524 B2 | | 12/2002 | Lambright | |
| 6,981,729 B2 | * | 1/2006 | Steury | 296/26.04 |

* cited by examiner

*Primary Examiner*—Dennis H. Pedder
*Assistant Examiner*—Michael Hernandez
(74) *Attorney, Agent, or Firm*—Butzel Long

(57) ABSTRACT

An extendable and retractable support system for raising and lowering structures, including covers or tops of mobile and immobile dwellings which includes a plurality of telescopic assemblies. The telescopic assemblies include at least two tube members that are provided with enclosed sides and a centrally located internal channel structure that is parallel to and proximal to a center of the tube members, though which internal channel structures one of a plurality of spring elements extends. A mechanism extends and retracts the spring elements thereby causing the telescopic assemblies to extend and retract.

20 Claims, 9 Drawing Sheets

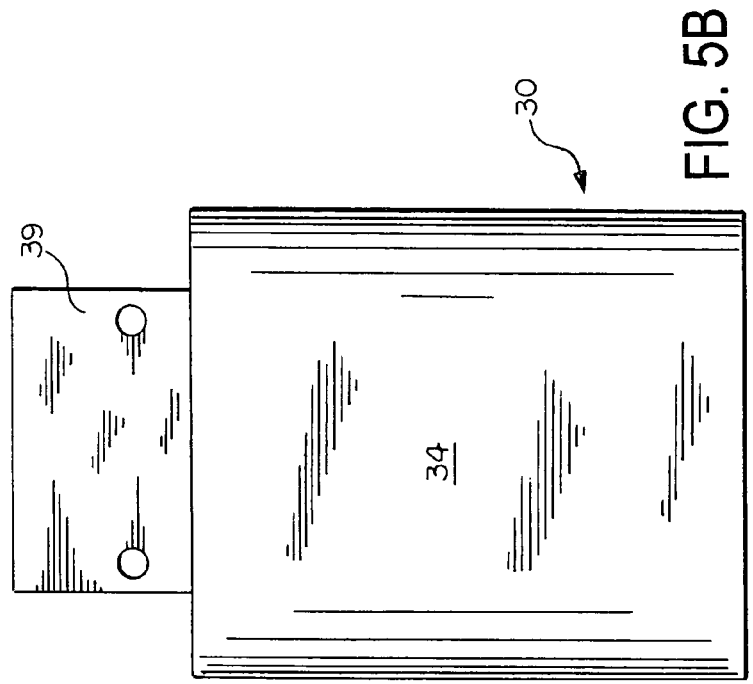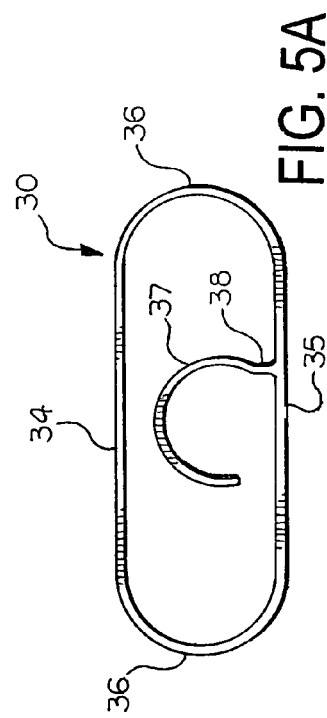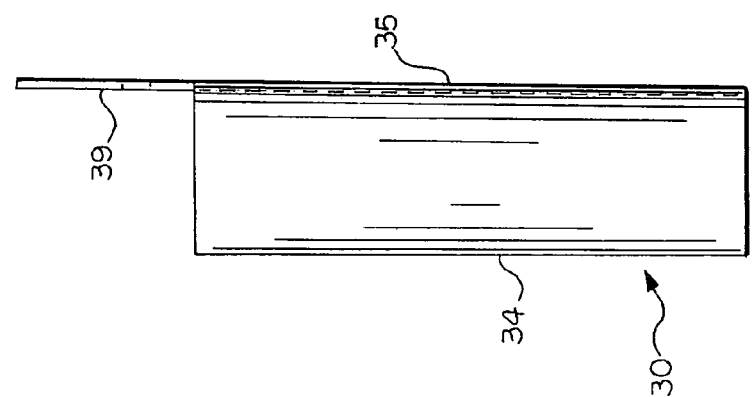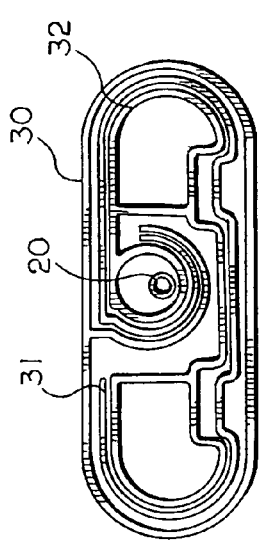
FIG. 5B
FIG. 5A
FIG. 5C
FIG. 4

EXTENDABLE AND RETRACTABLE SUPPORT SYSTEM

TECHNICAL FIELD

The present invention relates to mechanisms which are used to raise and lower structures, including covers or tops of mobile and immobile dwellings. More particularly, the present invention is directed to extendable and retractable support systems having telescopic assemblies which are used to raise and lower various structures, including covers or tops of mobile and immobile dwellings.

BACKGROUND ART

Towable tent campers and pop-up trailers having collapsible roofs are generally known in the art. Prior art mechanisms used for raising and lowering collapsible tops on such structures are generally balky, hard to operate and maintain, and prone to failure. For example, many lifting mechanisms rely on cranks and cables that are exposed to the elements, can accumulate dirt and debris, and can bind, slip and stretch. Mechanisms which are based upon gear driven assemblies are significantly heavier and more expensive to produce.

The following U.S. Patents exemplify known lifting mechanisms: U.S. Pat. No. 6,206,456 to Steury, U.S. Pat. No. 5,865,499 to Keyser, U.S. Pat. No. 5,769,485 to Bontrager et al., U.S. Pat. No. 5,704,677 to Steury et al., U.S. Pat. No. 4,981,319 to Gerzeny et al., U.S. Pat. No. 4,362,258 to French, U.S. Pat. No. 4,317,590 to Young, U.S. Pat. No. 4,201,413 to Rowe, U.S. Pat. No. 4,171,843 to Steury, U.S. Pat. No. 3,981,529 to Bontrager, U.S. Pat. No. 3,924,889 to Gogush, U.S. Pat. No. 3,519,306 to Young, and U.S. Pat. Nos. 6,494,524 and 6,443,516 to Lambright.

The present invention provides extendable and retractable support systems that include telescopic assemblies which can be used to raise and lower various structures, including covers or tops of mobile and immobile dwellings.

DISCLOSURE OF THE INVENTION

According to various features, characteristics and embodiments of the present invention which will become apparent as the description thereof proceeds, the present invention provides an extendable and retractable support system for raising and lowering a structure which comprises:

a base;

a structure to be raised and lowered relative to the base;

a plurality of telescopic assemblies coupled between the base and the structure to be raised and lowered;

a plurality of spring elements having first and second ends with the second ends of the spring elements being coupled to the plurality of telescopic assemblies; and a lift tube assembly coupled to the first ends of the spring elements, the lift tube assembly including a mechanism which, when activated, selectively extends or retracts each of the plurality of spring elements therefrom, each of the telescopic assemblies comprising at least two tube members that are telescopically coupled together and each of the at least two tube members comprising an inboard side, and outboard side, opposed ends and an internal channel that extends through the tube members, the channel having a central axis that is parallel to and proximal to a center of the tube members, though which channel one of the plurality of spring elements extends.

The present invention further provides for an extendable and retractable support system for raising and lowering a structure which comprises:

a base;

a structure to be raised and lowered relative to the base;

a plurality of telescopic assemblies coupled between the base and the structure to be raised and lowered;

a plurality of spring elements having first and second ends with the second ends of the spring elements being coupled to the plurality of telescopic assemblies; and a lift tube assembly coupled to the first ends of the spring elements, the lift tube assembly including a mechanism which, when activated, selectively extends or retracts each of the plurality of spring elements therefrom, each of the telescopic assemblies comprising at least two tube members that are telescopically coupled together and each of the at least two tube members comprising enclosed sides, and a centrally located internal channel structure that is parallel to and proximal to a center of the tube members, though which internal channel structures one of the plurality of spring elements extends.

BRIEF DESCRIPTION OF DRAWINGS

The present invention will be described with reference to the attached drawings which are given as non-limiting examples only, in which:

FIG. 4 is a cross sectional view of the telescopic tube assembly of FIG. 2 taken with the assembly in a retracted or lowered state.

FIG. 5a is a cross sectional view of the outermost tube member of the telescopic tube assembly according to the present invention.

FIG. 5b is a planar view of the inboard surface of the outermost tube member of the telescopic tube assembly.

FIG. 5c is a planar side view of the inboard surface of the outermost tube member of the telescopic tube assembly.

BEST MODE FOR CARRYING OUT THE INVENTION

The present invention is directed to mechanisms which are used to raise and lower structures, including covers or tops of mobile or immobile dwellings. More particularly, the present invention is directed to extendable and retractable support systems that include telescopic assemblies which are used to raise and lower various structures, including covers or tops of mobile and immobile dwellings.

The extendable and retractable support systems of the present invention utilize mechanisms which push flexible rods such as extension springs through tubular guides. The distal ends of the flexible rods are coupled to or otherwise engage end portions of telescopic assemblies which are configured to support the tops, covers, caps, roofs, etc. of various structures including stationary and mobile structures such as campers, mobile homes, trailers, etc. as well as permanent and temporarily facilities, huts, dwellings, shelters, etc.

The flexible rods can be coupled to various mechanisms that drive or push/pull the rods to raise/lower the telescopic assemblies, including push blocks which are driven by threaded screws of a main lift tube assembly, arms located on rotatable drums or cable driven blocks.

It is noted that although the extendable and retractable support systems of the present invention are described herein with reference to a pop-up camper, the extendable and retractable support systems are not to be construed as being limited for use with pop-up campers. In this regard, the extendable and retractable support systems of the present invention can be used in conjunction with any type of structure including stationary and mobile structures such as campers, mobile homes, trailers, etc. as well as permanent and temporarily facilities, huts, dwellings, shelters, etc.

Figure 1:
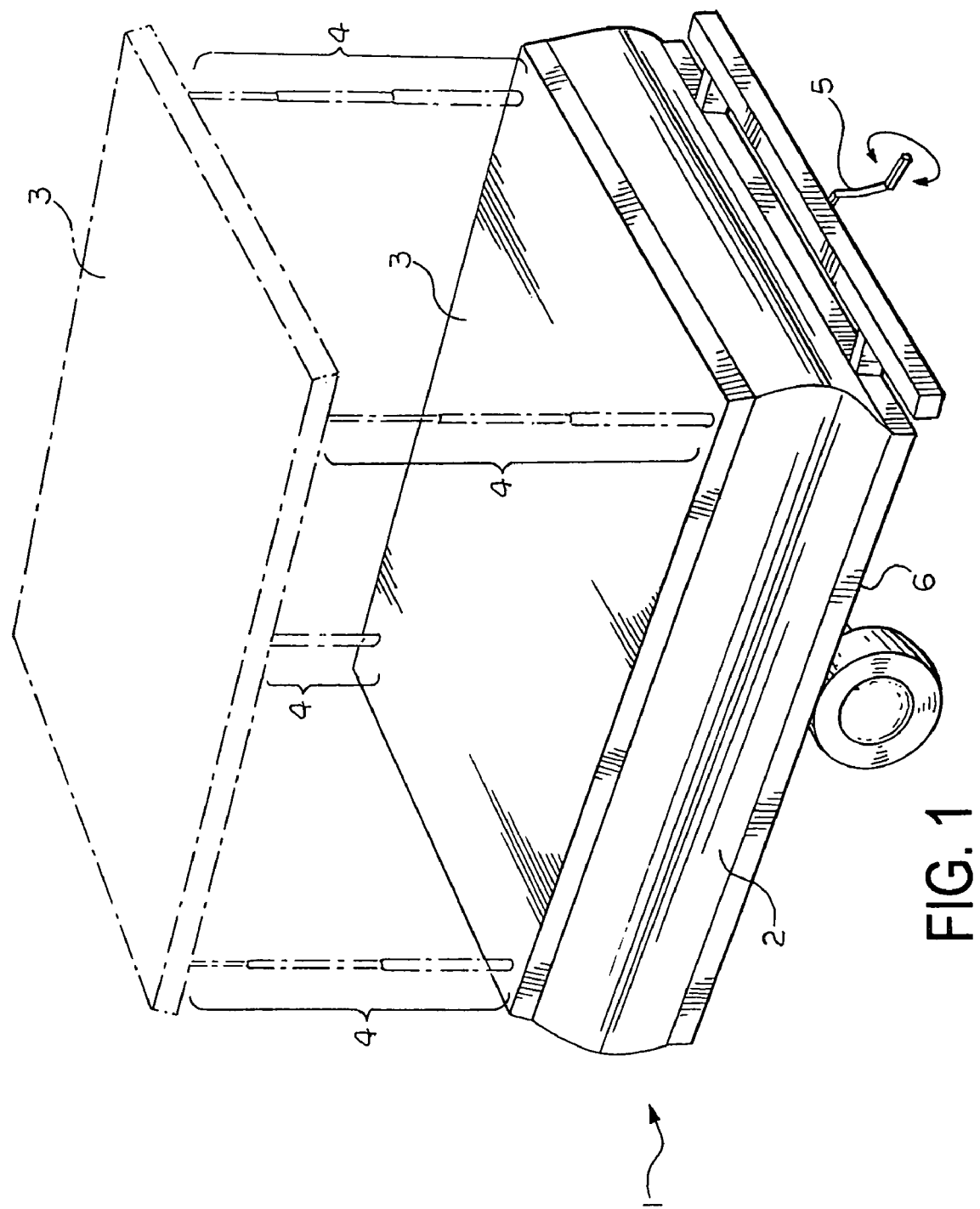
FIG. 1 is a perspective view of a camper which has a top that is movable between raised and lowered positions.

FIG. 1 is a perspective view of a camper which has a top that is movable between raised and lowered positions. The camper 1 includes a frame 6, a base 2 which underlies a top 3 that can be raised or lowered by telescopic tube assemblies 4 located adjacent outer corners of the top 3. The lowered position of top 3 is depicted in solid lines and the raised position is depicted in phantom. The telescopic tube assemblies 4 are depicted in phantom in their raised positions. FIG. 1 also depicts a manual crank handle 5 which can be used to activate the mechanism that raises and lowers the top 3. It is to be understood that, although camper 1 is used in FIG. 1 for illustrative purposes, the extendable and retractable support system of the present invention can be used in conjunction with various structures including stationary and mobile structures such as campers, mobile homes, trailers, etc. as well as permanent and temporarily facilities, huts, dwellings, shelters, etc. The extendable and retractable support systems of the present invention can be used to raise and lower, tops, covers, caps, roofs and similar structures.

In FIG. 1, the top 3 is depicted as being substantially coextensive with base 2. In other embodiments, the extendable and retractable support systems of the present invention can be used in conjunction with covers or tops that are not coextensive with their respective bases. Also, the extendable and retractable support systems of the present invention can use telescopic tube assemblies which are positioned in any suitable location to support the weight of a cover, top, canopy, etc.

Although a manual crank handle 5 is depicted in FIG. 1, it is to be understood that the extendable and retractable support systems of the present invention can be used in conjunction with an electrically driven mechanism.

Figure 2:
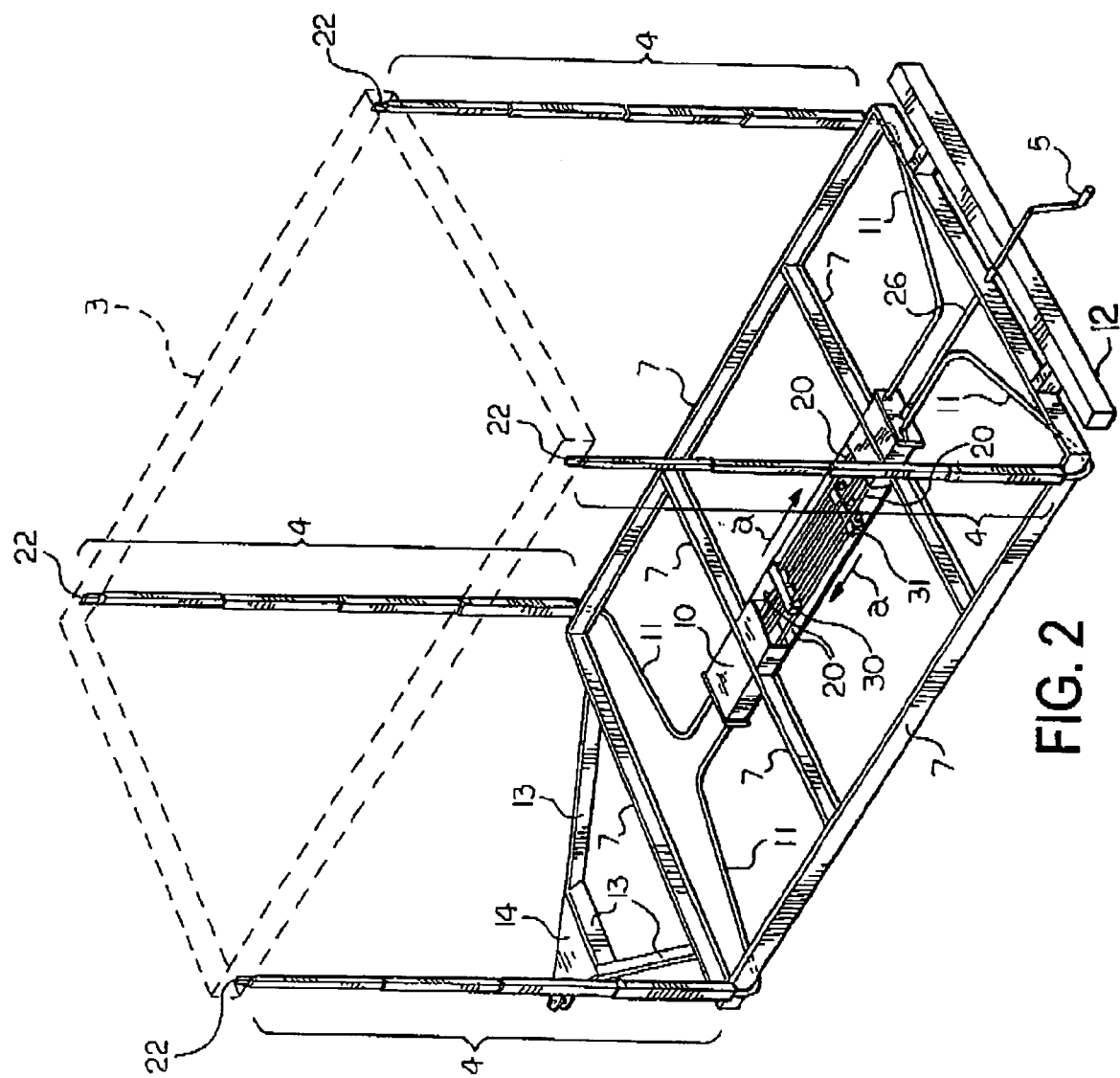
FIG. 2 is a perspective view of a camper frame which includes an extendable and retractable support system according to one embodiment of the present invention.

FIG. 2 is a perspective view of a camper frame which includes an extendable and retractable support system according to one embodiment of the present invention. FIG. 2 depicts how the extendable and retractable support mechanism of the present invention can be coupled to frame elements 7 of camper 1. That is, the main lift tube assembly 10 is depicted as being centrally located in the base 6 of the camper between frame elements 7. The telescopic tube assemblies 4 are coupled to the main lift tube assembly 10 by spring tubes 11. Spring tubes 11 are conduit structures in which spring elements 20, e.g. extension springs extend between main lift tube assembly 10 and the upper sections of the telescopic tube assemblies 4. As the main lift tube assembly 10 extends and retracts spring elements 20 therefrom, the spring elements 20 moved through spring tubes 11. Spring tubes 11 contain or guide the movement of spring elements 20 so that spring elements 20 raise and lower telescopic tube assemblies 4. Arrows "a" in FIG. 2 depict how push blocks 30, 31 of the main lift tube assembly 10 move when the spring elements 20 are pushed through spring tubes 11. The main lift tube assembly depicted in FIG. 2 is described in detail in U.S. Pat. No. 6,494,524, the complete disclosure of which is hereby expressly incorporated by reference.

FIG. 2 depicts how the manual crank handle 5 can be positioned to extend beyond the bumper 12 of camper 1. Although FIG. 2 depicts the main lift tube assembly 10 as being orientated so that the manual crank handle 5 extends from the rear of the camper 1, it is possible to orient the main lift tube assembly 10 so that the manual crank handle 5 extends from one of the sides or the front of camper 1. The frame 13 of the tongue 14 of the camper 1 is depicted in FIG. 2.

Figure 3:
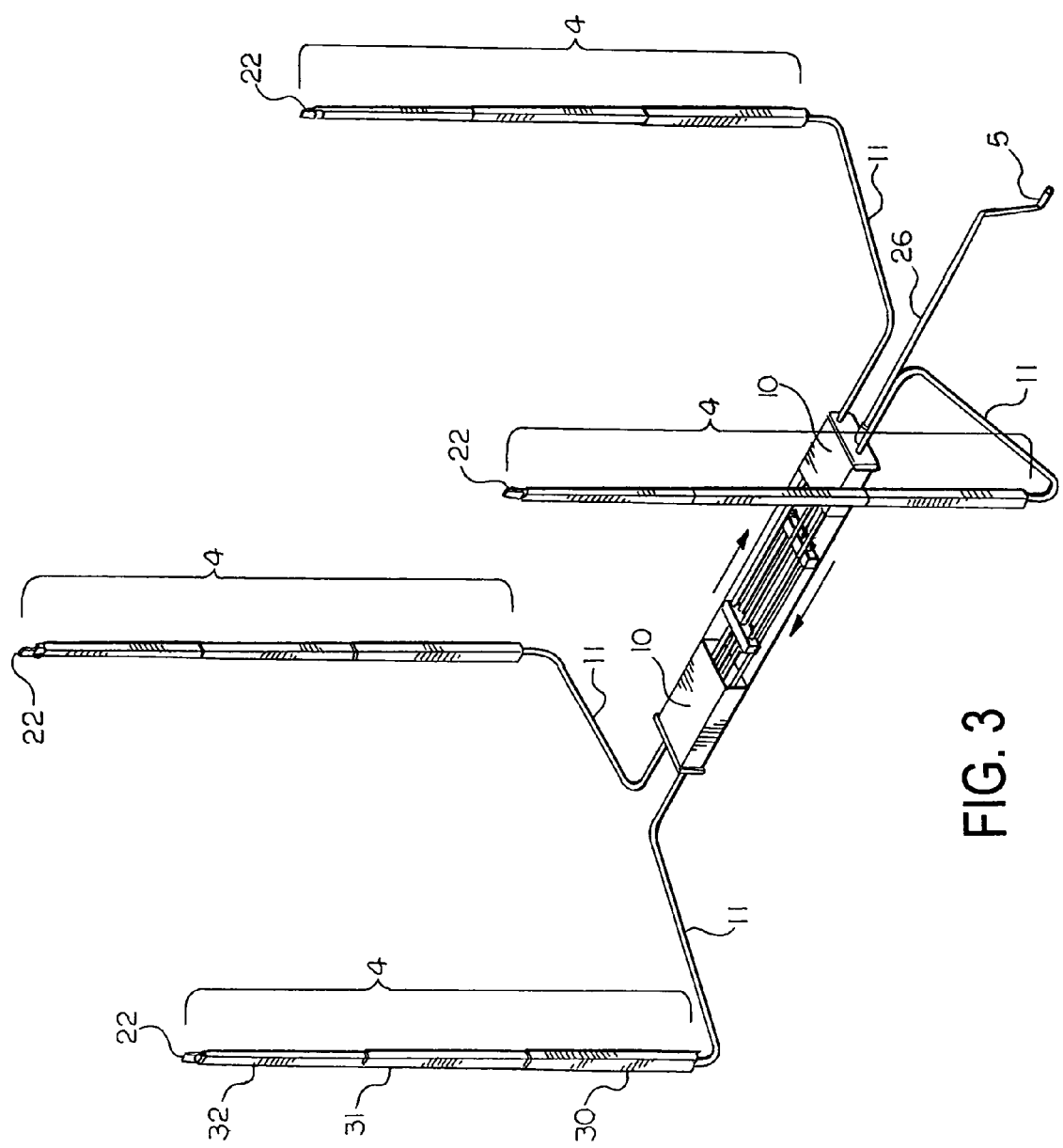
FIG. 3 is a perspective view of the extendable and retractable support system of FIG. 2.

FIG. 3 is a perspective view of the extendable and retractable support system of FIG. 2. FIG. 3 depicts the telescopic tube assemblies 4 as having a plurality of tube members which can expand in a telescopic manner. The upper or distant most or end element of the telescopic tube assemblies 4 includes a bracket 22 by which the telescopic tube assemblies 4 can be coupled to a top, cover, etc.

FIG. 4 is a cross sectional view of the telescopic tube assembly of FIG. 2 taken with the assembly in a retracted or lowered state. The telescopic tube assembly includes an outermost tube member 30 an intermediate tube member 31 and an innermost tube member 32 which are coupled together in a telescoping manner whereby the assembly can be extended so that the intermediate tube member 31 extends from a distal end of the outermost tube member 30 and the innermost tube member 32 extends from a distal end of the intermediate tube member 31 as discussed below. In general, each of the outermost, intermediate and innermost tube members 30, 31 and 32 includes a cylindrical structure that defines a central channel which is configured to receive one of the spring elements 20 of the main lift tube assembly 10. FIG. 4 depicts how the outermost, intermediate and innermost tube members 30, 31 and 32 are configured to be received within one another. Details of the individual tube members of the telescopic tube assembly will be described in more detail below.

FIG. 5a is a cross sectional view of the outermost tube member of the telescopic tube assembly according to the present invention. FIG. 5b is a planar view of the outboard surface of the outermost tube member of the telescopic tube assembly. FIG. 5c is a planar side view of the inboard surface of the outermost tube member of the telescopic tube assembly. The outermost tube member 30 has a generally oblong outer shape with parallel inboard and outboard sides 34, 35 and curved ends 36. A cylindrical structure 37 that defines a central channel extends from a leg 38 that connects the cylindrical structure 37 to the inner surface of the outboard side 35 so that the cylindrical structure 37 is located at or near the longitudinal center of the outermost tube member 30 as depicted in FIG. 5a. As shown in FIGS. 5b and 5c the outboard side 35 of the outermost tube member 30 includes a mounting bracket 39, which can be used to secure the outermost tube member 30 and hence the entire telescopic tube assembly to one of the frame elements 7 of the camper 1 as depicted in FIG. 1 or the base of other structures.

Although the mounting bracket 39 is depicted as having a generally rectangular shape in FIG. 5b, and being flat as depicted in FIG. 5c, it is to be understood that any suitable mounting bracket structure can be used and adapted for a particular application such as a camper, or other mobile or immobile dwelling. Moreover, multiple bracket structures can be used.

Figure 6B:
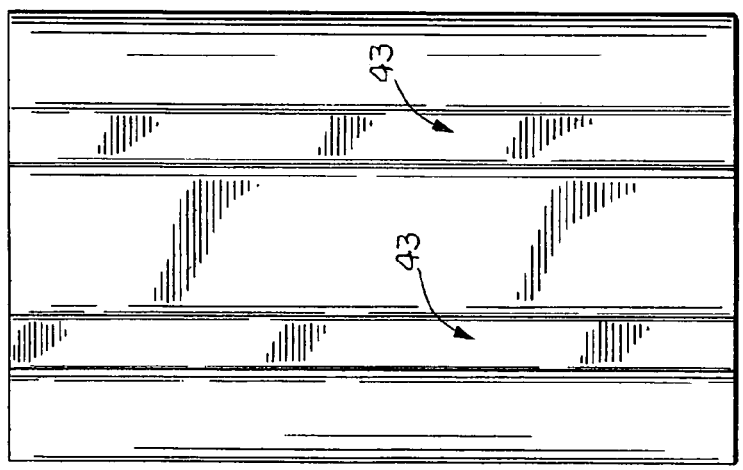
FIG. 6b is a planar view of the inboard surface of the intermediate tube member of the telescopic tube assembly.
Figure 6A:
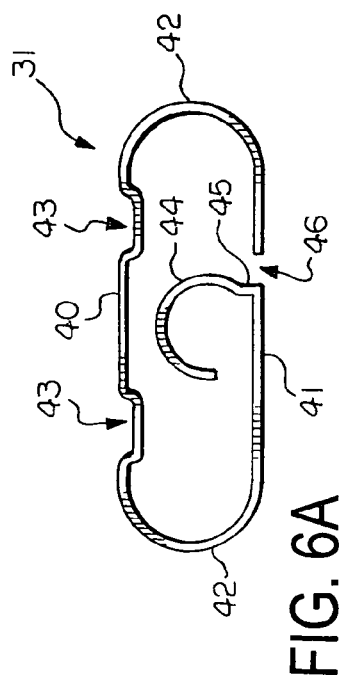
FIG. 6a is a cross sectional view of an intermediate tube member of the telescopic tube assembly according to the present invention.

FIG. 6a is a cross sectional view of an intermediate tube member of the telescopic tube assembly according to the present invention. FIG. 6b is a planar view of the inboard surface of the intermediate tube member of the telescopic tube assembly. The intermediate tube member 31 can be described as having a generally oblong outer shape with parallel inboard and outboard sides 40, 41 and curved ends 42 with a pair of parallel spaced apart channels 43 formed in the inboard side 40. A cylindrical structure 44 that defines a central channel extends from a leg 45 that connects the cylindrical structure 44 to the inner surface of the outboard side 41 so that the cylindrical structure is located at or near the longitudinal center of the intermediate tube 31 as depicted in FIG. 6a. There is a gap or space 46 in the outboard side 41 adjacent the leg 45 that support the cylindrical structure 44. This gap or space 46 allows the leg 38 of the outermost tube member 30 to pass there through as shown in FIG. 4.

The parallel spaced apart channels 43 formed in the inboard side 40 on the intermediate tube member 31 extend along the length of the tube as shown in FIG. 6b. These channels 43 provide structural strength to the intermediate tube 31 and provide a guide mechanism between the intermediate tube member 31 and the innermost tube member 32 as explained below.

Figure 7B:
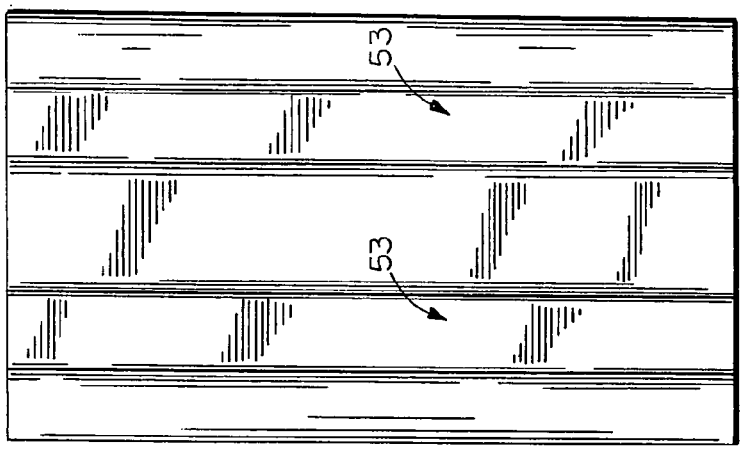
FIG. 7b is a planar view of the inboard surface of the innermost tube member of the telescopic tube assembly.
Figure 7A:
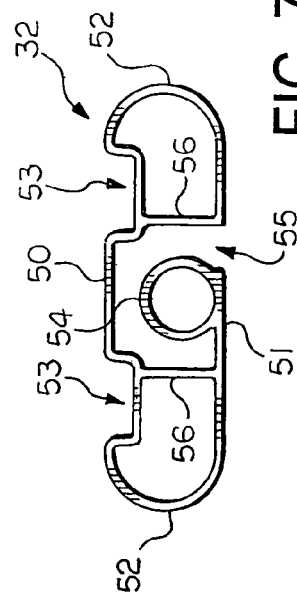
FIG. 7a is a cross sectional view of an innermost tube member of the telescopic tube assembly according to the present invention.

FIG. 7a is a cross sectional view of an innermost tube member of the telescopic tube assembly according to the present invention. FIG. 7b is a planar view of the inboard surface of the innermost tube member of the telescopic tube assembly. The innermost tube member 32 can be described as having a generally oblong outer shape with parallel inboard and outboard sides 50, 51 and curved ends 52 with a pair of parallel spaced apart channels 53 formed in the inboard side 50. A cylindrical structure 54 that defines a central channel is coupled to the inner surface of the outboard side 51 so that the cylindrical structure 54 is located at or near the longitudinal center of the intermediate tube 32 as depicted in FIG. 7a. There is a gap or space 55 in the outboard side 51 adjacent the cylindrical structure. This gap or space 55 allows the legs 38 and 45 of the intermediate tube member 31 and the outermost tube member 30 to pass there through as shown in FIG. 4.

The parallel spaced apart channels 53 formed in the inboard side 50 on the intermediate tube member 32 extend along the length of the tube as shown in FIG. 7b. These channels 53 provide structural strength to the innermost tube member 32 and provide a guide mechanism between the intermediate tube member 31 and the innermost tube member 32 as explained below.

Internal cross pieces 56 extend between the inboard and outboard sides 50 and 51 of the innermost tube member 32. The internal cross pieces 56 are evenly spaced apart with the outboard end of one of the internal cross pieces 56 coinciding with the outer edge of gap or space 55 as shown.

It is to be understood that additional internal support elements (cross pieces) could be included in the innermost tube member 32 as long as such structures do not interfere with the ability of the innermost tube member 32 to slide within the intermediate tube member 31.

As shown in FIG. 4 the cylindrical structures 37, 44 and 54 of the outermost, intermediate and innermost tube members 30, 31 and 32 are coaxial about a common center axis. In addition, the parallel spaced apart channels 43 formed in the inboard side 40 on the intermediate tube member 31 are configured to be slidingly received in the parallel spaced apart channels 53 formed in the inboard side 50 of the innermost tube member 32 as shown in FIG. 4.

Figure 8:
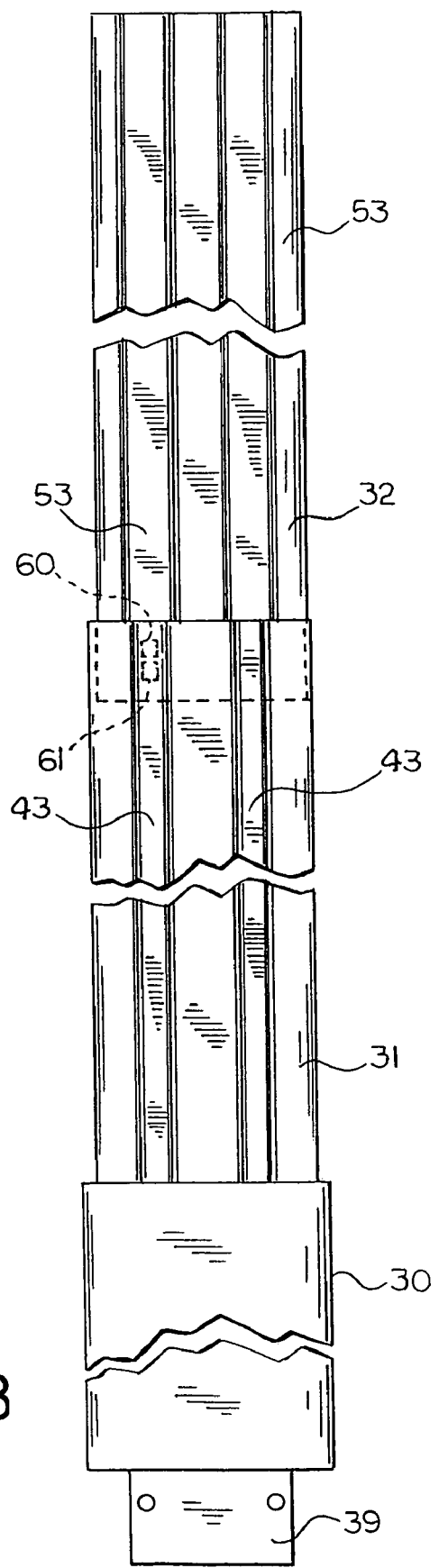
FIG. 8 is a planar view of the inboard surface of the telescopic tube assembly in an extended or raised state.

FIG. 8 is a planar view of the inboard surface of the telescopic tube assembly in an extended or raised state. The manner in which the parallel spaced apart channels 43 formed in the inboard side 40 on the intermediate tube member 31 are slidingly received in the parallel spaced apart channels 54 formed in the inboard side 50 of the innermost tube member 32 is shown in FIG. 8.

A spring element 20 extends through the cylindrical structures 37, 44 and 54 in each of the outermost, intermediate and innermost tube members 30, 31 and 32 of each individual telescopic assembly 4. The end of each spring element 20 pushes against a stop on an upper end of the innermost tube member 32 or against an underside of the top of one of the innermost tube members 32. Alternatively, the end of each spring element 20 can be secured to an upper portion of the innermost tube member 32 by any suitable fastening means, such as a screw, bolt, etc.

In order to raise the intermediate tube member 31 with the innermost tube member 32, interengagable protuberances or abutments 60 and 61 are fixed to or formed on intermediate tube member 31 and the innermost tube member 32 respectively. As shown in FIG. 8 a protuberance or abutment 61 is located adjacent a lower margin of the outer surface of the inboard wall of the innermost tube member 32 and a protuberance or abutment 60 is located adjacent a lower margin of the inner surface of the inboard wall of the intermediate tube member 31. Such a manner of providing for engagement of telescopic assemblies is known as exemplified by U.S. Pat. No. 6,206,456. As shown in FIG. 8, the protuberances or abutments 60 and 61 are located in channels 43 and 53 of the intermediate and innermost tube members 31 and 32. Although not shown in FIG. 8, it is within the scope of the present invention to provide sets of protuberances or abutments 60 and 61 in each of the pair of channels 43 and 53 of the intermediate and innermost tube members 31 and 32.

Figure 9:
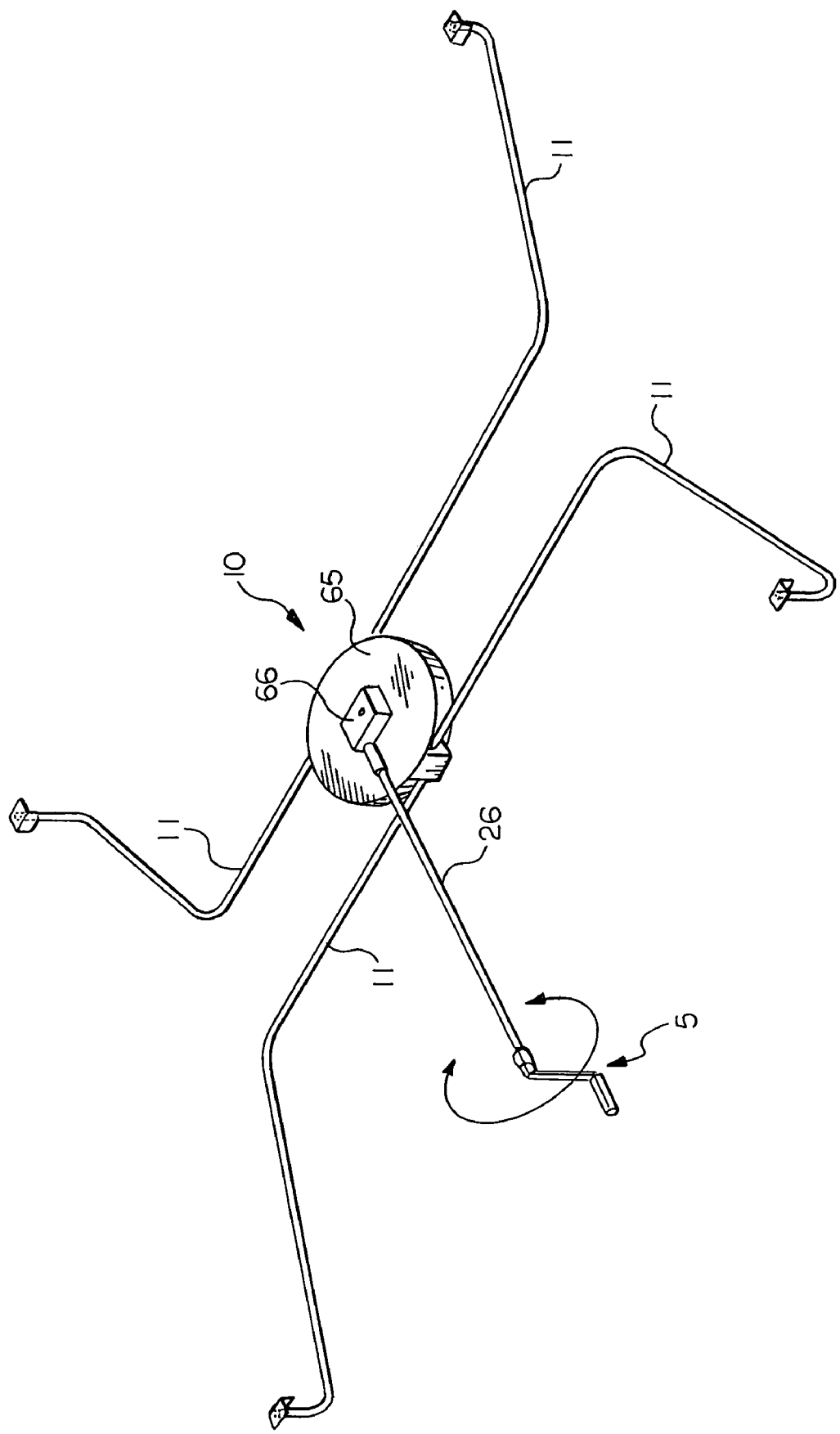
FIG. 9 is a perspective view of an alternative main lift tube assembly according to the present invention.

FIG. 9 is a perspective view of an alternative main lift tube assembly according to the present invention.

The main lift tube assembly 10 shown in FIG. 9 includes a rotating drum assembly 65 from which spring elements 20 can be pushed into and pulled from spring tubes 11 as discussed below. The rotating drum assembly includes a manual crank handle 5 which is coupled thereto by a crank tube 26. A gear assembly 66 couples the crank tube 26 to the drum assembly 65. In further embodiments, an electrical actuator can be used in place of manual crank handle 5.

Figure 10:
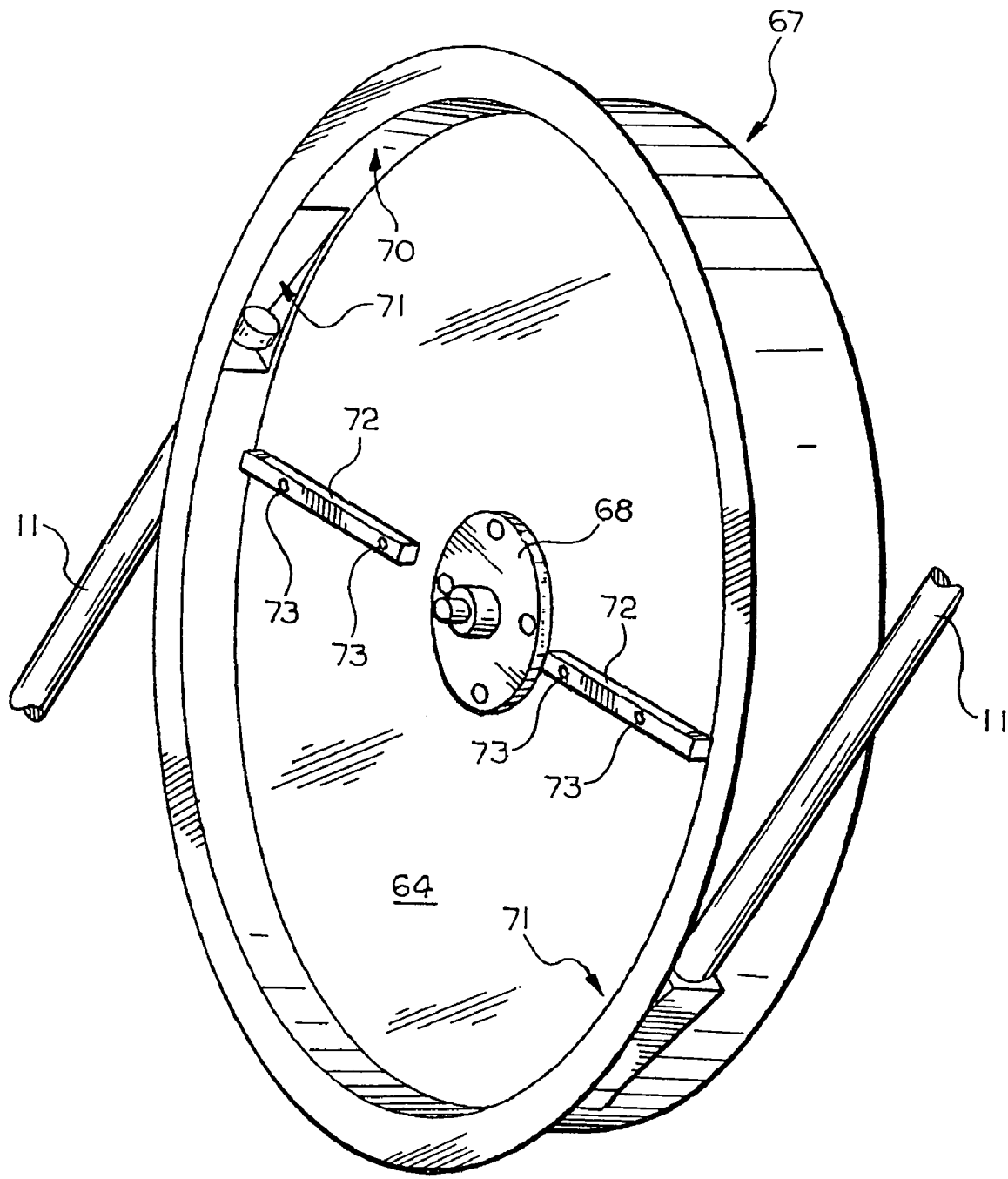
FIG. 10 is a perspective view of a portion of the rotating drum of FIG. 9.

FIG. 10 is a perspective view of a portion of the rotating drum of FIG. 9.

The rotating drum assembly 65 of the embodiment of FIG. 9 includes two drum elements which can rotate in opposite directions or in the same direction. FIG. 10 depicts one of the drum elements 67. Drum element 67 includes a central hub 68 which is coupled to a drive mechanism 66 which can rotate drum element 67 when manual crank handle 5 is rotated. The drum element 67 includes a face 64 which is recessed by peripheral wall 70. The peripheral wall 70 includes two opposed openings 71 at which spring tubes 11 are tangentially coupled as depicted. Two radially aligned arms 72 are provided on the face 64 of drum element 67. The arms 72 can be fastened to the face 64 of drum element 67 by mechanical fasteners 73 such as bolts, or otherwise can be integrally formed thereon.

Figure 11:
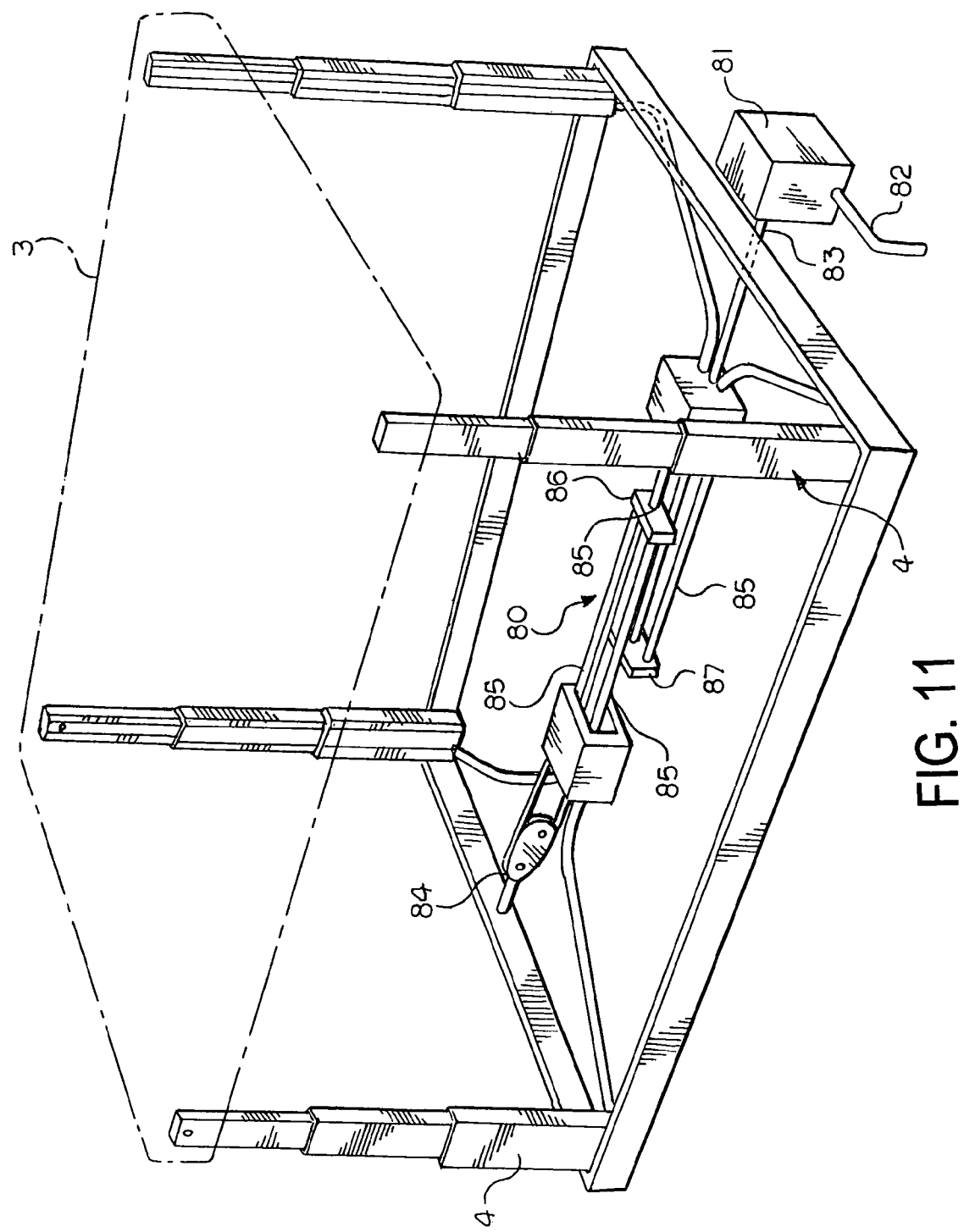
FIG. 11 is a perspective view of an alternative main lift tube assembly according to the present invention.

FIG. 11 is a perspective view of an alternative main lift tube assembly according to the present invention. In the embodiment of the main lift tube assembly shown in FIG. 11, actuator 80 includes a winch 81 having a crank handle 82 that can be used to manually rotate winch 81. A cable 83 extends from the winch 81 through the vehicle body and around a pulley 84 for connection to push rods 85. A first cross member 86 connects an upper or reverse run of the cable 83 with the push rods 85 and a second cross member 87 connects a lower run of the cable 83 with the push rods 85. Rotation of the winch 81 in one direction causes the cross members 86 and 87 to move towards one another, while rotation of the winch 81 in the opposite direction causes the cross members 86 and 87 to move away from one another. The cross members 86 and 87 are coupled to the spring elements 20 so that movement of the cross members 86 and 87 away from one another causes the spring elements 20 to be retracted from the telescoping assemblies 4, and so that movement of the cross members 86 and 87 toward one another causes the spring elements 20 to be extending into the telescoping assemblies 4.

It is to be understood that the orientation of the telescopic assemblies could be reversed so that the inboard and outboard sides could be turned around. The top of the innermost tube member 32 could be closed off and the bottom of the outermost tube member 30 could be closed off, provided a connection was made for the spring elements 20 to enter. The protuberances or abutments 60 and 61 could be placed in different locations that that shown in FIG. 8 such as outside of the parallel channel structures. Although the telescopic assembly is described and show in reference to three tube members, it is also possible to use two or more than three tube members.

The reference to the inboard and outboard sides of the tube members of the telescopic tube assemblies could be reversed if desired, so that the channels 43 and 54 in the intermediate tub member 31 and innermost tube member 32 would be in an outboard side of the telescopic tube assemblies 4.

The configuration of the individual tube members can very from that shown. However, keeping the centers of the cylindrical structures of the tube members at or near the longitudinal centers of the tube members will allow a centrally position spring element to apply a substantially centrally balanced application of force when extending the telescopic assemblies.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above.

What is claimed is:

1. An extendable and retractable support system for raising and lowering a structure which comprises:
   a base;
   a structure to be raised and lowered relative to the base;
   a plurality of telescopic assemblies coupled between the base and the structure to be raised and lowered;
   a plurality of spring elements having first and second ends with the second ends of the spring elements being coupled to the plurality of telescopic assemblies; and
   a lift tube assembly coupled to the first ends of the spring elements, the lift tube assembly including a mechanism which, when activated, selectively extends or retracts each of the plurality of spring elements therefrom,
   each of the telescopic assemblies comprising at least two tube members that are telescopically coupled together and each of the at least two tube members comprising an inboard side, and outboard side, opposed ends and an internal structure that extends into the interior of the tube members from one of the inboard and outboard sides and defines an internal channel that is spaced apart from the opposite ends and extends through the tube members, said channel having a central axis that is parallel to and proximal to a center of the tube members, tough which channel one of the plurality of spring elements extends.

2. An extendable and retractable support system for raising and lowering a structure according to claim 1, wherein the at least two tube members comprise at least three tube members.

3. An extendable and retractable support system for raising and lowering a structure according to claim 2, wherein each of the at least two tube members has a generally oblong cross-sectional shape.

4. An extendable and retractable support system for raising and lowering a structure according to claim 1, wherein a pair of parallel channels are formed in one of the inboard and the outboard sides of at least one of the tube members.

5. An extendable and retractable support system for raising and lowering a structure according to claim 1, wherein the at least two tube members includes an innermost tube member and an outermost tube member and the outermost tube member includes a bracket for mounting the telescopic assemblies to the base.

6. An extendable and retractable support system for raising and lowering a structure according to claim 5, wherein the at least two tube members includes an innermost tube member, an intermediate tube member and an outermost tube member and the intermediate tube member and the innermost tube members are provided with cooperative interengagable structures.

7. An extendable and retractable support system for raising and lowering a structure according to claim 1, wherein the internal channel of each of the at least two tube members has a cylindrical shape.

8. An extendable and retractable support system for raising and lowering a structure according to claim 1, wherein the at least two tube members includes an innermost tube member and an outermost tube member and the internal channel of the innermost tube member has a cylindrical shape with a closed cylindrical wall and the internal channel of the outermost tube member has a cylindrical shape with an open cylindrical wall and an adjacent gap formed in an outer wall.

9. An extendable and retractable support system for raising and lowering a structure according to claim 1, wherein the base comprises a base of a camper and the structure to be raised and lowered comprises a top of the camper.

10. An extendable and retractable support system for raising and lowering a structure according to claim 1, wherein the spring elements extending in the channels in the at least two tube members has a distal end tat is secured to an innermost tube member of the at least two tube members.

11. An extendable and retractable support system for raising and lowering a structure which comprises:
   a base;
   a structure to be raised and lowered relative to the base;
   a plurality of telescopic assemblies coupled between the base and the structure to be raised and lowered;
   a plurality of spring elements having first and second ends with the second ends of the spring elements being coupled to the plurality of telescopic assemblies; and
   a lift tube assembly coupled to the first ends of the spring elements, the lift tube assembly including a mechanism which, when activated, selectively extends or retracts each of the plurality of spring elements therefrom,
   each of the telescopic assemblies comprising at least two tube members that are telescopically coupled together and each of the at least two tube members comprising enclosed sides, and an internal structure that extends into the interior of the tube members from a side portion and defines a centrally located internal channel structure that is spaced apart from other side portions of the tube members and parallel to and proximal to a center of the tube members, through each of said internal channel structures one of the plurality of spring elements extends.

12. An extendable and retractable support system for raising and lowering a structure according to claim 11, wherein the at least two tube members comprise at least three tube members.

13. An extendable and retractable support system for raising and lowering a structure according to claim 11, wherein each of the at least two tube members has a generally oblong cross-sectional shape.

14. An extendable and retractable support system for raising and lowering a structure according to claim 11, wherein a pair of parallel channels are formed in one of the inboard and the outboard sides of at least one of the tube members.

15. An extendable and retractable support system for raising and lowering a structure according to claim 11, wherein the at least two tube members includes an innermost tube member and an outermost tube member and the outermost tube member includes a bracket for mounting the telescopic assemblies to the base.

16. An extendable and retractable support system for raising and lowering a structure according to claim 11, wherein the at least two tube members includes an innermost tube member, an intermediate tube member and an outermost tube member and the intermediate tube member and the innermost tube members are provided with cooperative interengagable structures.

17. An extendable and retractable support system for raising and lowering a structure according to claim 11, wherein the internal channel of each of the at least two tube members has a cylindrical shape.

18. An extendable and retractable support system for raising and lowering a structure according to claim 11, wherein the at least two tube members includes an innermost tube member and an outermost tube member and the internal channel of the innermost tube member has a cylindrical shape with a closed cylindrical wall and the internal channel of the outermost tube member has a cylindrical shape with an open cylindrical wall and an adjacent gap formed in an outer wall.

19. An extendable and retractable support system for raising and lowering a structure according to claim 11, wherein the base comprises a base of a camper and the structure to be raised and lowered comprises a top of the camper.

20. An extendable and retractable support system for raising and lowering a structure according to claim 11, wherein the spring elements extending in the channels in the at least two tube members has a distal end that is secured to an innermost tube member of the at least two tube members.

* * * * *